United States Patent
Su et al.

(10) Patent No.: US 11,456,547 B2
(45) Date of Patent: Sep. 27, 2022

(54) HEADERLESS HARNESS CONNECTION ASSEMBLY AND METHODS OF CONSTRUCTING AND UTILIZING SAME

(71) Applicant: Vitesco Technologies USA, LLC, Auburn Hills, MI (US)

(72) Inventors: Patrick Su, Shelby Township, MI (US); Kevin D. Moore, Bloomfield Hills, MI (US)

(73) Assignee: Vitesco Technologies USA, LLC, Auburn Hills, MI (US)

( * ) Notice: Subject to any disclaimer, the term of this patent is extended or adjusted under 35 U.S.C. 154(b) by 83 days.

(21) Appl. No.: 16/949,963

(22) Filed: Nov. 21, 2020

(65) Prior Publication Data

US 2022/0166155 A1    May 26, 2022

(51) Int. Cl.
| | |
|---|---|
| *H01R 12/57* | (2011.01) |
| *H01R 12/51* | (2011.01) |
| *H01B 7/00* | (2006.01) |
| *B60R 16/02* | (2006.01) |

(52) U.S. Cl.
CPC ......... *H01R 12/515* (2013.01); *H01B 7/0045* (2013.01); *H01R 12/57* (2013.01); *B60R 16/0207* (2013.01)

(58) Field of Classification Search
CPC .... H01R 12/515; H01R 12/57; H01B 7/0045; B60R 16/0207
USPC ...................................................... 174/72 A
See application file for complete search history.

(56) References Cited

U.S. PATENT DOCUMENTS

| | | | | |
|---|---|---|---|---|
| 4,744,006 A | * | 5/1988 | Duffield | G06F 1/185 361/792 |
| 5,004,427 A | * | 4/1991 | Lindeman | H01R 13/2407 439/101 |
| 5,097,592 A | * | 3/1992 | Schultz, Jr. | H05K 3/103 439/604 |
| 5,281,150 A | * | 1/1994 | Bundga | H01R 12/62 439/497 |
| 5,310,352 A | * | 5/1994 | Mroczkowski | H01R 13/24 439/378 |
| 5,337,388 A | * | 8/1994 | Jacobowitz | G02B 6/3897 385/76 |
| 5,396,573 A | * | 3/1995 | Ecker | G02B 6/3817 385/94 |
| 5,805,402 A | * | 9/1998 | Maue | B60R 16/0207 361/115 |
| 5,811,732 A | * | 9/1998 | Beam | H02G 3/00 361/627 |
| 6,000,955 A | * | 12/1999 | Zaderej | H01R 13/6658 439/79 |
| 6,183,269 B1 | * | 2/2001 | Sarkissian | H01R 13/2442 439/76.1 |

* cited by examiner

*Primary Examiner* — Timothy J Thompson
*Assistant Examiner* — Michael F McAllister

(57) ABSTRACT

A harness connector for an electronics device is disclosed, the electronics device having a housing and a printed circuit board disposed in the housing, and the housing including an opening exposing electrical contacts of the printed circuit board. The harness connector includes a base member with a plurality of apertures defined therein, the base member directly attached to the housing and disposed over the opening, and a plurality electrical contacts electrically connected to the electrical contacts of the printed circuit board.

17 Claims, 8 Drawing Sheets

HEADERLESS HARNESS CONNECTION ASSEMBLY AND METHODS OF CONSTRUCTING AND UTILIZING SAME

FIELD OF INVENTION

The present invention generally relates to an electrical connection for an electronics housing, and particularly to a harness connector providing a headerless connection to the housing.

BACKGROUND

There are widely used and/or standard-based connections for communicatively connecting to electronics devices. For example, in connecting to the electronics or engine control unit (ECU) of a vehicle, as shown in FIGS. 1-3, an Ethernet connection includes an Ethernet header 12 which is fixedly attached to the housing 10 of the ECU by two fasteners 14. The ECU includes a printed circuit board (PCB) 16 disposed in housing 10. The header 12 includes a central opening 18 having disposed therein contacts which are electrically connected to PCB 16 via pins 20 that extend from PCB 16. An Ethernet harness connector 30 mechanically engages with header 12 and includes pins or contacts which electrically connect to the contacts of header 12, thereby providing electrical connections to PCB 16.

Though connections such as the Ethernet connection discussed above may provide for secure and effective electrical connections to an ECU or other electronics device, such connections are not optimal with respect to cost of manufacture and performance.

SUMMARY

Example embodiments are generally directed to an electronics device including harness connector which is directly attached to the housing of the electronics device. The electronics device includes a printed circuit board having a plurality of electrical contacts; a housing in which the printed circuit board is disposed, the housing including an opening exposing the electrical contacts; and a harness connector directly attached to the housing and disposed over the opening, the harness connector including a plurality electrical contacts electrically connected to the electrical contacts of the printed circuit board.

The housing includes one or more apertures disposed along a surface of the housing relative to the opening, and the harness connector includes a base member having one or apertures which align with the one or more apertures of the housing. The harness connector further includes one or more fasteners which extend through the one or more apertures of the base member and engage with the one or more apertures of the housing.

The harness connector may include a base member having a segment which is disposed at least partly within the opening of the housing, with the plurality of electrical contacts disposed at least partly in the segment of the base member.

The harness connector may further include a seal member disposed between the segment and a portion of the housing defining the opening thereof, such that the seal member provides a sealed relationship between the base member and the portion of the housing defining the opening thereof. The seal member may be constructed of a compressible, resilient material and includes ribs disposed along a first surface of the seal member for engaging with the portion of the housing defining the opening thereof, and ribs disposed along a second surface of the of the seal member for engaging with an outer surface of the segment of the base member. The seal member may include a radial groove which engages with the portion of the housing defining the opening thereof. The seal member may include a first portion disposed over an outer surface of the housing surrounding the opening thereof, and a second portion inserted in the opening of the housing.

In an example embodiment, the harness connector may include a base member which is disposed over the opening of the housing, and a plate member which is disposed along a surface of the base member over or under the base member. One of the base member and the plate member may latch the other of the base member and the plate member in place relative to the one of the base member and the plate member.

The harness connector further comprises a plurality of wires which are mechanically and electrically connected to the electrical contacts of the harness connector, wherein one of the wires and the electrical contacts extends through one or more apertures in the plate member.

Each of the electrical contacts of the printed circuit board may include a through-hole, and each of the electrical contacts of the harness connector includes a compliant, press-fit male contact member inserted in a corresponding through-hole of the printed circuit board. Alternatively, the printed circuit board may include pins extending therefrom, and the electrical contacts of the harness connector includes female connector members which engage with the pins of the printed circuit board.

According to another example embodiment, a harness connector is disclosed for an electronics device having a housing and a printed circuit board disposed in the housing, and the housing including an opening exposing electrical contacts of the printed circuit board. The harness connector includes a base member with a plurality of apertures defined therein, the base member directly attached to the housing and disposed over the opening; and a plurality electrical contacts electrically connected to the electrical contacts of the printed circuit board.

The base member may include a segment which extends at least partly into the opening of the housing, the segment defining an inner space, and the plurality of contacts are disposed at least partly in the inner space of the segment. The harness connector may further include a seal member disposed around at least a portion of the segment, with the seal member constructed from a compressible, resilient composition so as to form a seal between the segment and a portion of the housing defining the opening thereof. The harness connector may further include a second seal member disposed within the inner space of the segment.

The base member may include a seal member having a radial groove formed therein, the groove engaging with a portion of the housing which defines the opening. The electrical contacts of the harness connector may extend at least partly through the seal member.

In one example embodiment, each of the electrical contacts of the printed circuit board includes a through-hole, and each of the electrical contacts of the harness connector may include a compliant, press-fit male contact member, each press-fit male connector inserted in a corresponding through-hole of the printed circuit board. In another example embodiment, the printed circuit board includes male connector members extending therefrom, and the electrical contacts of the harness connector comprise female connector members which engage with the pins of the printed circuit board.

BRIEF DESCRIPTION OF THE DRAWINGS

Aspects of the invention will be explained in detail below with reference to exemplary embodiments in conjunction with the drawings, in which.

DETAILED DESCRIPTION

The following description of the example embodiment(s) is merely exemplary in nature and is in no way intended to limit the invention, its application, or uses.

The example embodiments presented herein are generally directed to an electrical connection to ECUs and other electronic devices that provide improved electrical connectivity at a reduced manufacturing cost. In general terms, the example embodiments eliminate the header that is attached to the ECU housing such that the harness connector is directly connected to the ECU housing which allows for direct or more direct electrical connectivity to the ECU PCB and results in reduced wire length for connections to the PCB.

Figure 4:
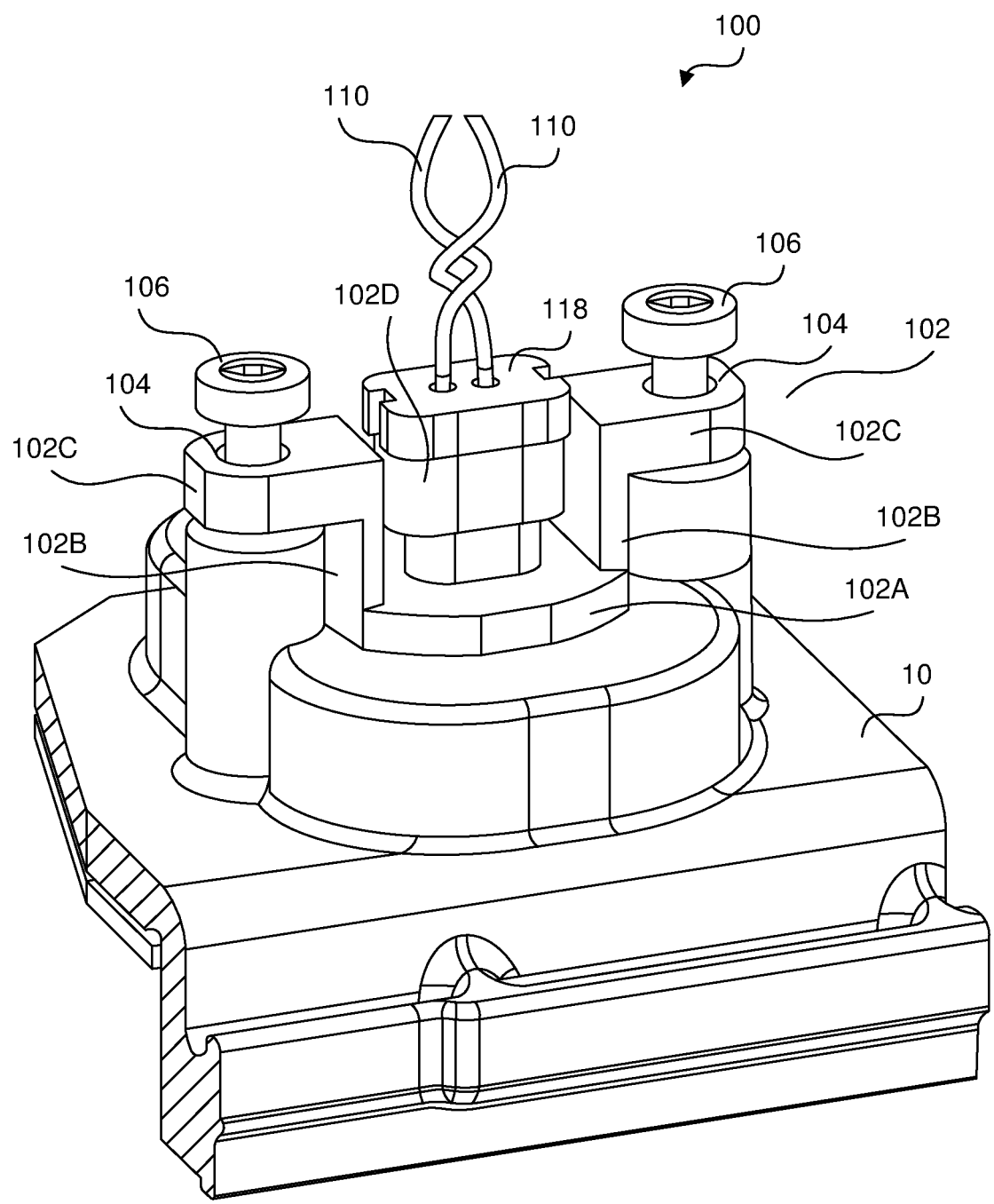
FIG. 4 is a partial perspective view of an electronics device housing and harness connector connected thereto, according to an example embodiment.
Figure 5:
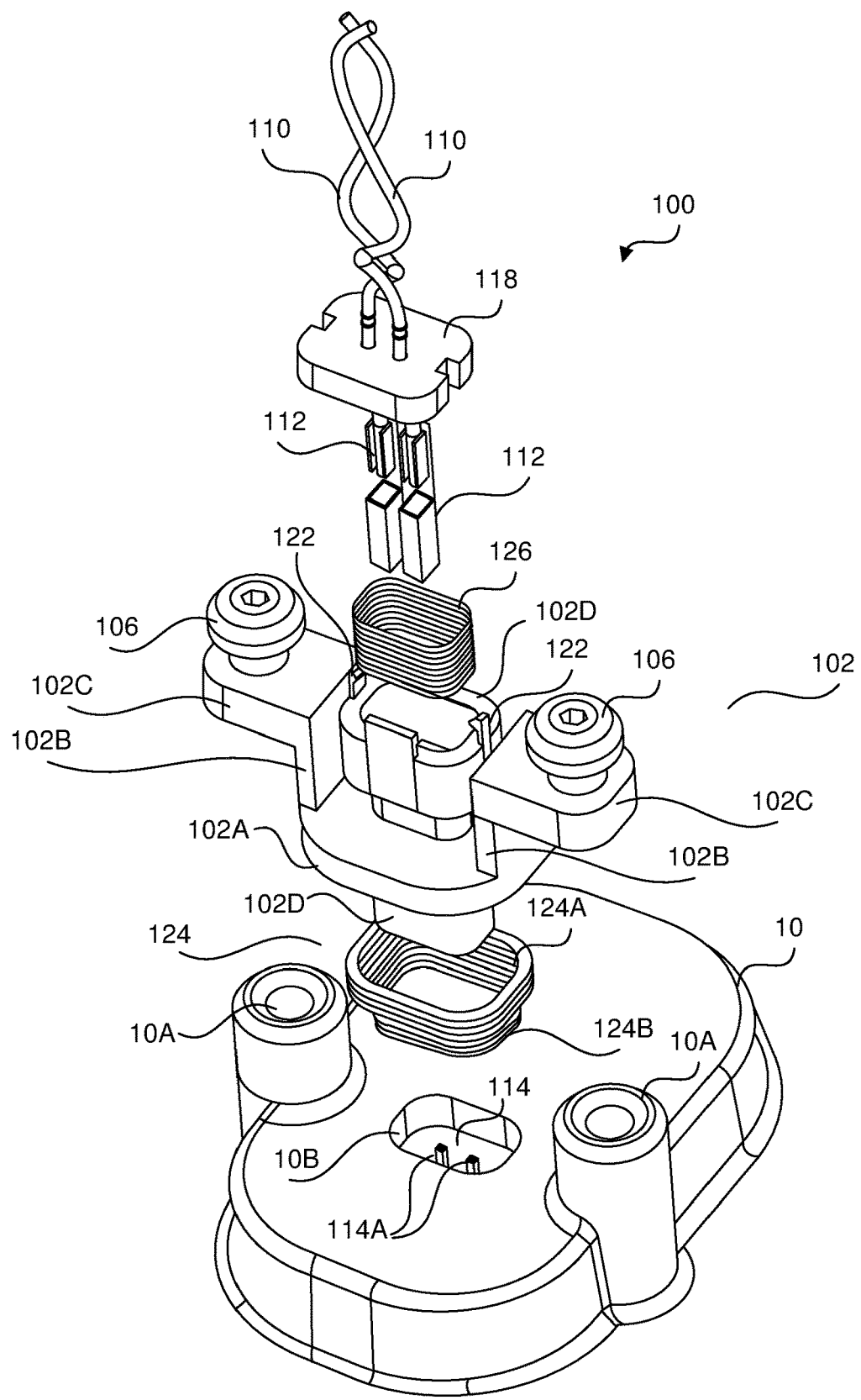
FIG. 5 is an exploded perspective view of the electronics device housing and harness connector of FIG. 4.
Figure 6:
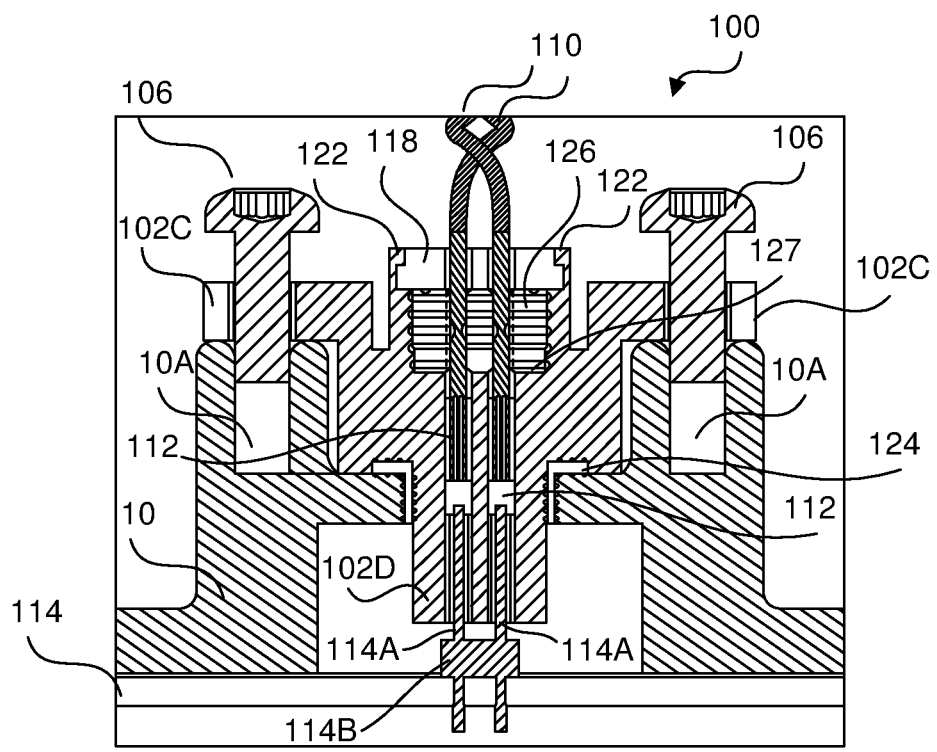
FIG. 6 is cross sectional view of the electronics device housing and harness connector of FIG. 4.

Referring to FIGS. 4-6, there is shown a harness connector 100 according to an example embodiment. Harness connector 100 includes elongated base member 102. Base member 102 includes a first segment 102A; second segments 102B, each of which extends orthogonally from a surface of first segment 102A in parallel with each other; and third segments 102C, each of which extends from a distal end of a corresponding second segment 102B. Second segments 102B and third segments 102C can be seen to form wing-shaped extensions from first segment 102A. In the illustrated embodiment, upper and lower surfaces of each third segment 102C are parallel to upper and lower surfaces of first segment 102A. Stated another way, upper surfaces of third segment 102C are coplanar, and lower surfaces of third segment 102C are coplanar.

Best seen in FIG. 4, each third segment 102C includes an aperture 104 defined therethrough. Apertures 104 are sized for fasteners 106 to pass therethrough. Fasteners 106 are sized for engaging with apertures 10A of a housing 10 of the electronics device. Fasteners 106 may be bolts or screws for providing a threaded engagement with housing 10, or may be other engagement members. Harness connector 100 forms part of the electronics device when connected to housing 10 thereof. In an example embodiment, the electronics device is an ECU.

Base member 102 further includes, extending from opposed major surfaces of first segment 102A, fourth segments 102D. Fourth segments 102D extend from first segment 102A in opposite directions. Each fourth segment 102D defines an inner space. In the illustrated embodiment, fourth segments 102D are coaxial relative to each other. In addition, first segment 102A of base member 102 includes a cutout portion defined through first segment 102A from which fourth segments 102D extend, resulting in fourth segments 102D and first segment 102A defining an inner space which passes or extends from a distal end portion of one fourth segment 102D to a distal end portion of the other fourth segment 102D.

Harness connector 100 further includes a plurality of wires 110 and a plurality of electrical contacts 112 which provide electrical connectivity between wires 110 and PCB 114. In an example embodiment, this inner space may be divided into multiple, separate spaces so that electrical contacts 112 are fixedly disposed within base member 102. Best seen in FIG. 6, each electrical contact 112 is disposed within its own channel extending at least partly through fourth parts 102D and first part 102A.

Wires 110 and electrical contacts 112 are at least partly disposed in the inner space defined by fourth segments 102D of base member 102. Electrical contacts 112 may be constructed from a metal composition. While a first end of each contact 112 is mechanically coupled to a pin 114A and/or contact of PCB 114, a second end of each contact 112 is mechanically coupled to an end of a wires 110. Wires 110 may terminate at another electrical connector (not shown) for communicatively connecting electronics device 120 to other devices. Best seen in FIG. 5, each electrical contact 112 includes a first portion which wraps around and is otherwise mechanically connected to a corresponding wire 110, and a second portion which is mechanically connected to a contact or pin 114A on PCB 114. In the illustrated embodiment, PCB 114 includes pins 114A extending from PCB 114 and each electrical contact 112 is a female member for fitting over and otherwise engaging a PCB pin 114A. It is understood that, alternatively, pins 114A of PCB 114 may be female members, such as through-holes defined in PCB 114 which are electrically connected to signal lines in or on PCB 114, and electrical contacts 112 may be corresponding male members, such as pins, for engaging therewith. Herein, the term "contact" and "electrical contact" are used to refer to a component or member for establishing an electrical connection and may be configured as a male member, such as a pin, or a female member, such as a through-hole. Pins 114A are exposed by an aperture 10B defined in housing 10. As shown in FIG. 6, pins 114A are in the form of a pin block 114B which is secured to PCB 114. In this embodiment, pin block 114B may be a relatively inexpensive pin block which provides connectivity between electrical contacts 112 and metal signal lines in or on PCB 114. Though pin block 114B and corresponding pins 114A provide for through-hole electrical connections to PCB 114, it is understood that, alternatively, pins 114A of pin block 114B provide surface mount electrical connections to PCB 114. In yet another alternative embodiment, PCB 114 does not include a pin block 114A in or through which pins 114A extend.

Harness connector 100 may further include a plate member 118 through which wires 110 and/or a portion of electrical contacts 112 extend. In the illustrated example embodiment, plate member 118 is mechanically latched to base member 102. Specifically, base member 102 includes deflectable protrusions 122 (FIG. 5) which protrude from a fourth segment 102D of base member 102. A distal end of each deflectable protrusion 122 includes a head having a tapered portion and a ledge. During assembly, plate 118 is pressed into place against fourth segment 102D of base member 102, temporarily deflecting protrusions 122 until the distal ends thereof are passed by plate 118, at which point protrusions 122 are no longer deflected and return to their undeflected state which holds plate 118 in place by the ledge of the protrusions 122. It is understood that other latching and/or securing approaches may be utilized, such as the use of adhesives.

Figure 1:
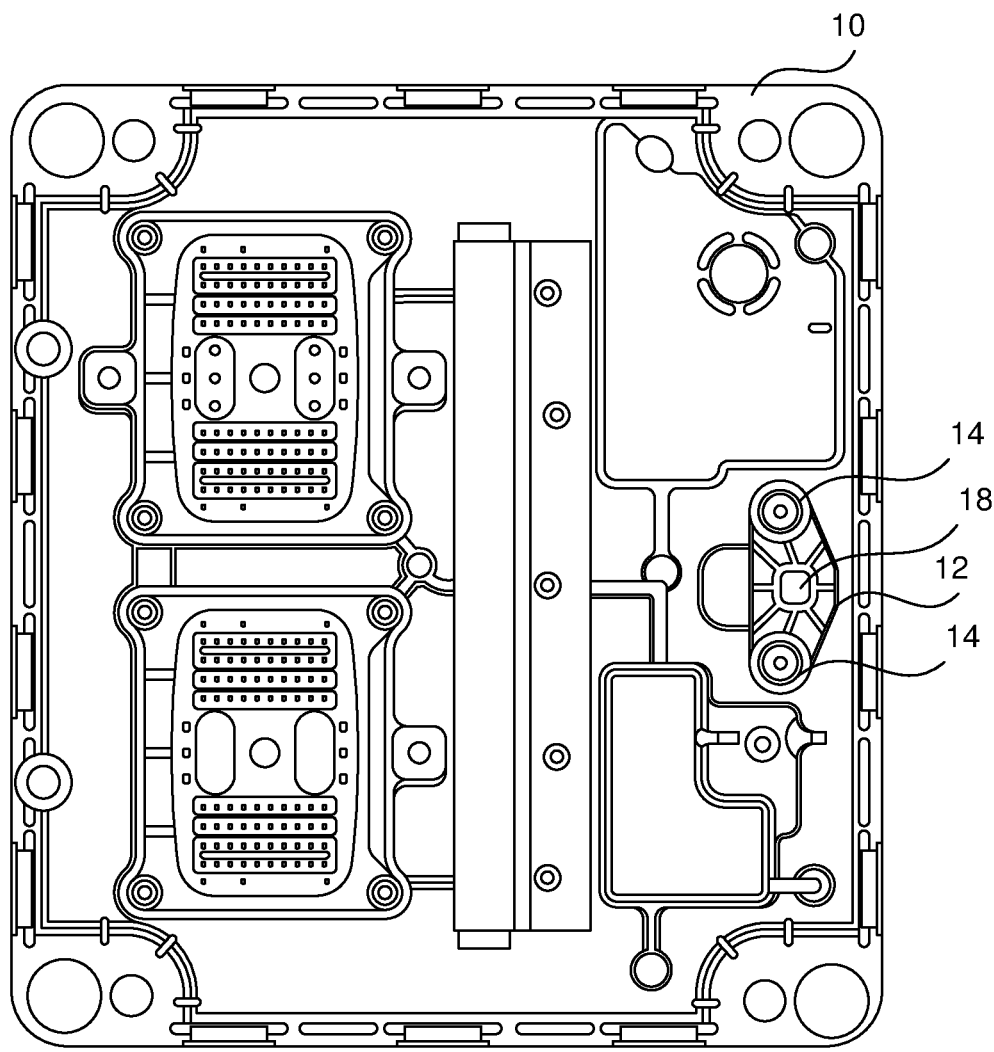
FIG. 1 is a top plan view of the housing of an existing electronics device.
Figure 2:
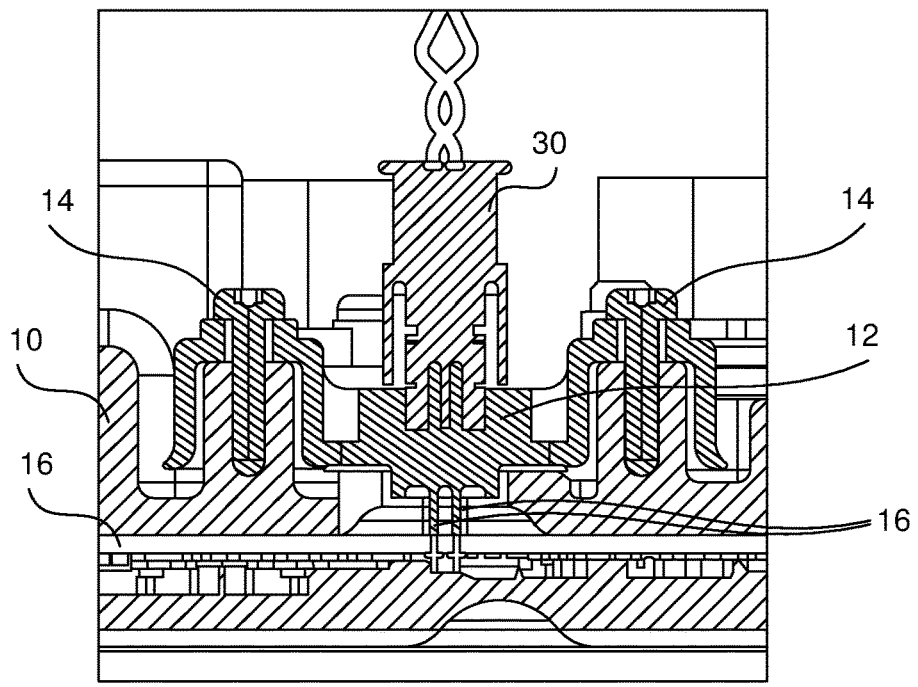
FIG. 2 is a side cross sectional view of a portion of the electronics device housing of FIG. 1.
Figure 3:
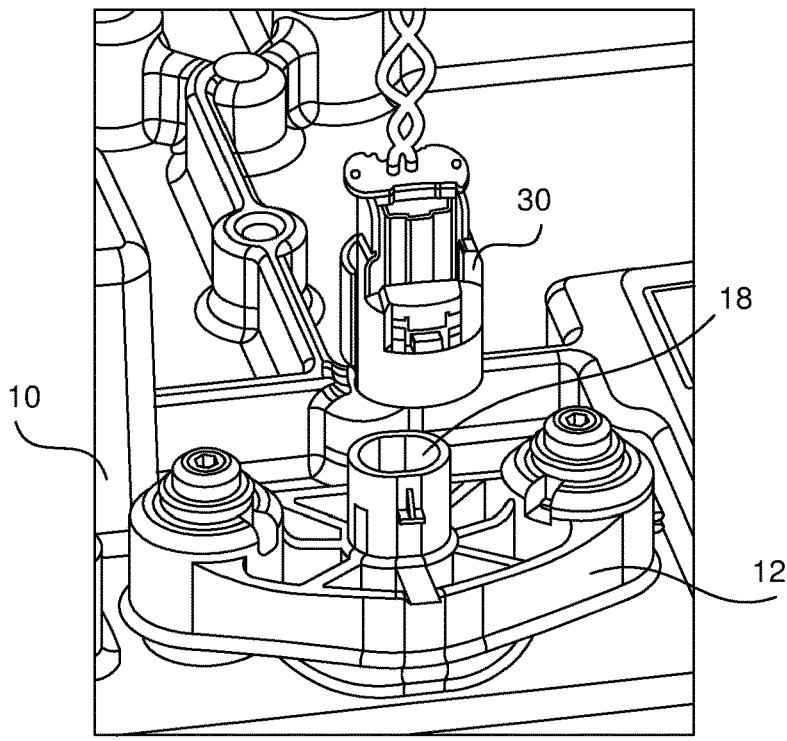
FIG. 3 is a perspective view of the portion of the electronics device housing of FIG. 2 showing an existing harness connector in exploded perspective view relative to the housing.

Harness connector 100 further includes a first seal member 124 for providing an airtight seal between base member 102 and housing 10 of electronics device 120. Specifically, first seal member 124 is constructed from a compressible, resilient material, such as a polymer composition. First seal member 124 is sized to fit around at least a portion of the lower fourth segment 102D of base member 102. First seal member 124 includes a first portion 124A and a second portion 124B which extends downwardly therefrom, as shown in FIGS. 5 and 6. First portion 124A and second portion 124B of first seal member 124 have the same inner diameter, with the outer diameter of first portion 124A being greater than the outer diameter of second portion 124B. Both first portion 124A and second portion 124B are sized and dimensioned to fit relatively tightly or otherwise snugly around the lower fourth segment 102D of base member 102. Second portion 124B is further sized to relatively tightly or otherwise snugly fit within the aperture 10B of housing 10. As shown in FIGS. 5 and 6, the surfaces of first portion 124A and second portion 124B include ribs. The ribs facilitate an airtight seal between first seal member 124, base member 102, and housing 10. First seal member 124 provides a sealed engagement between harness connector 100 and housing 10, which was provided in the existing design of FIGS. 1-3 by header 12, though having a different shape and structure from first seal member 124.

Specifically, with base member 102 connected and secured to housing 10 of electronics device 120, first portion 124A of first seal member 124 provides an airtight seal between an outer surface of housing 10 and a lower surface of first segment 102A of base member 102; and second portion 124B provides an airtight seal between an outer surface of the lower fourth segment 102D and the walls of housing 10 which define aperture 10B. In this way, first seal member 124 prevents air and moisture from passing between base member 102 and housing 10.

Harness connector 100 further includes a second seal member 126. Second seal member 126 is constructed from a compressible, resilient material, such as a polymer. Second seal member 126 is sized so that it is disposed within the upper fourth segment 102D of base member 102. Specifically, the upper fourth segment 102D may include an inner space defined between plate member 118 and a ledge 127 defined within the upper fourth segment 102D (FIG. 6). Second seal member 126 contacts the inner walls defining this inner space along the radial surface of second seal member 126, contacts ledge 127 along the axial lower surface of second seal member 126, and contacts plate member 118 along the axial upper surface of second seal member 126. In an example embodiment, second seal member 126 includes a plurality of ribs disposed circumferentially around the outer surface and along the axial top and bottom surfaces of second seal member 126. The ribs serve to provide an airtight seal between fourth segment 102D and plate member 118.

Harness connector 100 directly, mechanically couples to electronics device housing 10 and to PCB 114 of electronics device 120 by inserting at least a portion of the lower fourth segment 102D into aperture 10B of housing 10. Such insertion includes contacts 112 mechanically connecting to pins 114A which extend from PCB 114. Following insertion, fasteners 106 are inserted in apertures 10A of housing 10 and secured to housing 10.

Figure 7:
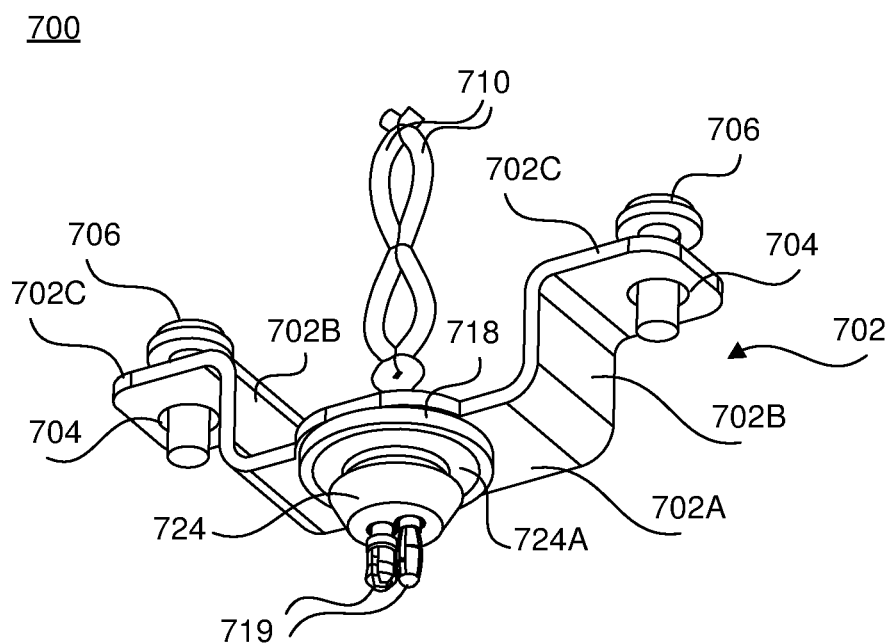
FIG. 7 is a perspective view of a harness connector according to another example embodiment.
Figure 8:
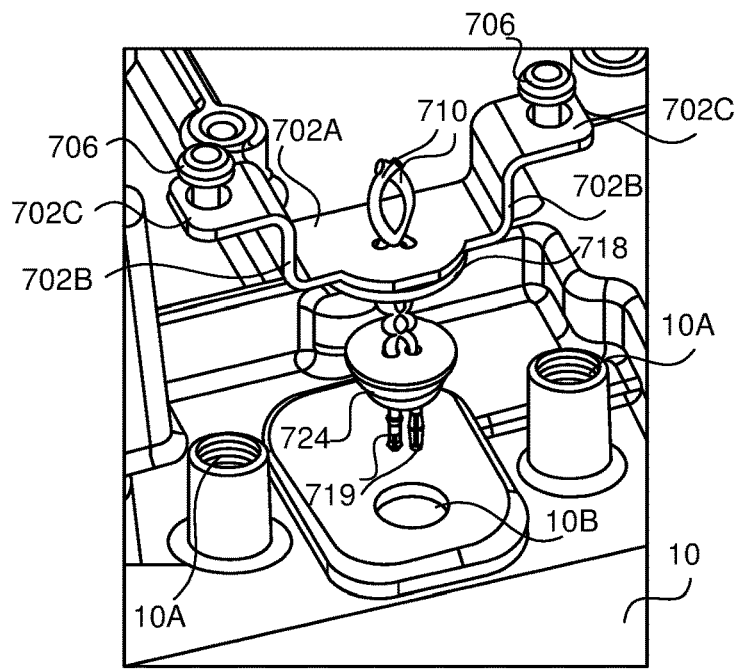
FIG. 8 is an exploded perspective view of the harness connector of FIG. 7 in association with an electronics device housing.
Figure 9:
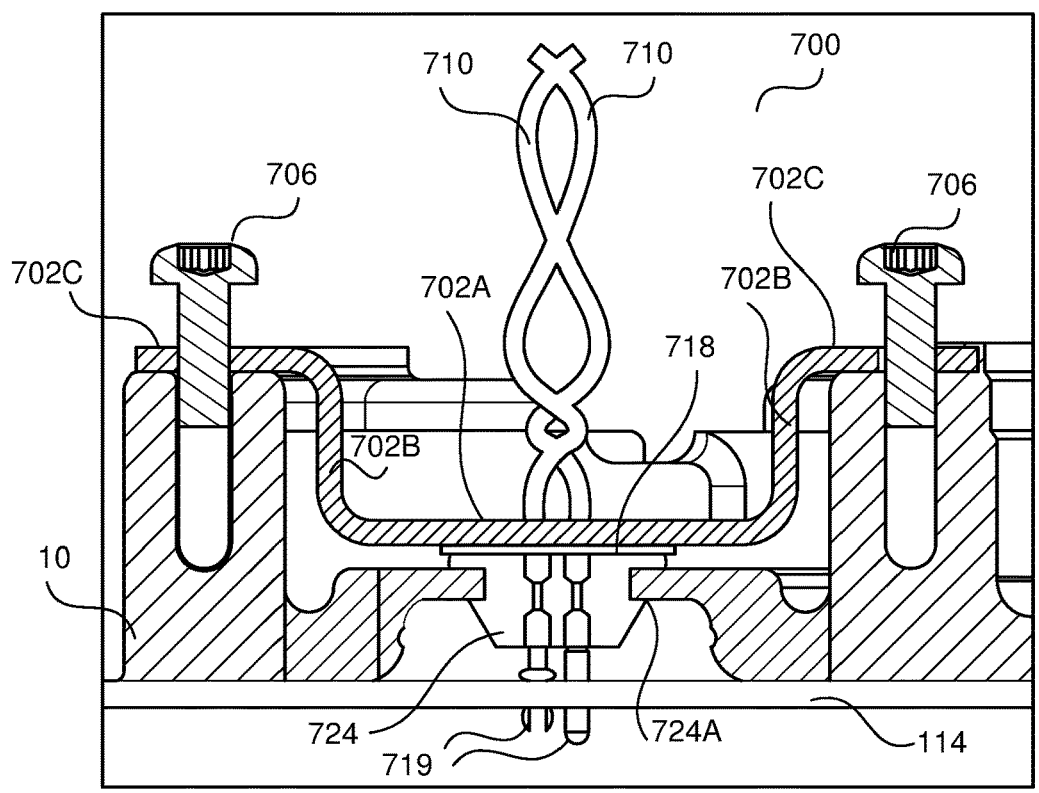
FIG. 9 is a cross sectional view of the harness connector of FIG. 7 connected to the electronics device.

FIGS. 7-9 illustrate a harness connector 700 according to another example embodiment. In this embodiment, like components between harness connector 700 and harness connector 100 have similar numbering.

Harness connector 700 includes a base member 702. Base member 702 has a generally "U" shape and includes an elongated first segment 702A. Extending orthogonally from each longitudinal end of first segment 702A is a second segment 702B. In the illustrated embodiment, second segments 702B are disposed in parallel with each other. A third segment 702C extends from a distal end of each second segment 702B. Like surfaces of third segments 702C are coplanar with each other. Defined laterally through each third segment 702C is an aperture 704. Apertures 704 are sized and dimensioned so that fasteners 706 extend therethrough. Fasteners 706, like fasteners 106 of harness connector 100, engage with housing 10 of electronics device 120 and secure harness connector 700 to the housing.

In contrast with harness connector 100 which includes electrical contacts 112 with female ends for physically connecting to male pins 114A of PCB 114, harness connector 700 includes pins 719 having male ends for connection with leads of PCB 114. As shown in FIG. 9, pins 719 are inserted in through-holes of PCB 114 and make electrical connections within PCB 114. Both pins 719 are compliant pins which form press-fit connections with PCB 114 by being inserted in through-holes of the PCB. A portion of pins 719 has a girth which resiliently decreases during insertion in the PCB through-hole and increases following insertion to engage with the PCB surfaces which defines the PCB through-hole. Pins 719 are mechanically connected to wires 710, thereby resulting in electrical connectivity between wires 710 and PCB 114. In another embodiment, pins 719 are not compliant pins for forming press-fit electrical connections with signal lines on PCB 114, and may be through-hole pins or surface mount pins or leads. In yet another embodiment, harness connector 700 includes female contacts or pins which engage with male pins of PCB 114.

Harness connector 700 includes a rigid plate member 718 which in the illustrated embodiment is disposed beneath and against the lower surface of first segment 702A. Harness connector 700 further includes a seal member 724 disposed against and adjacent a lower surface of plate member 718. Seal member 724 is constructed from a compressible, resilient composition, such as a polymer composition. As shown in FIGS. 7 and 9, seal member 724 includes a radial groove 724A which is sized and shaped so as to engage with the wall of housing 10 which defines housing aperture 10B. This engagement between seal member 724 and housing 10 is a sealed, airtight connection.

Figure 10:
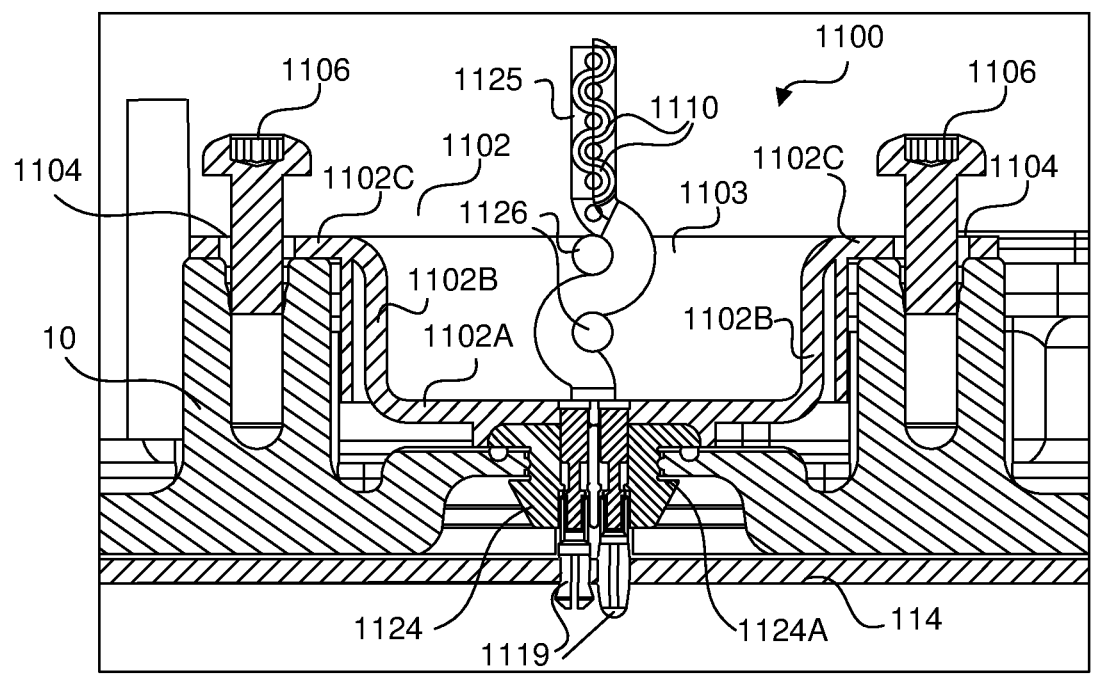
FIG. 10 is a cross sectional view of a harness connector connected to an electronics device according to another example embodiment.

FIG. 10 illustrates a harness connector 1100 according to another example embodiment, like components between harness connector 1100 and harness connector 700 have similar numbering. Harness connector 1100 includes a U-shaped base member 1102 having a first segment 1102A from which a second segment 1102B extends from each longitudinal end of first segment 1102A. A third segment 1102C extends from each distal end of second segment 1102B. An aperture 1104 is defined through each third segment 1102C. A fastener 1106 is inserted through a corresponding aperture 1104 for direct engagement with a hole 10A in electronics device housing 10. Harness connector 1100 also includes a back member 1103 which is connected between second segments 1102B and extends from third segments 1102C to first segment 1102A. Back member 1103 provides further rigidity to harness connector 1100.

Harness connector 1100 further includes a seal member 1124 which is disposed adjacent a lower surface of first segment 1102A. Similar to seal member 724 of harness connector 700, seal member 1124 is constructed from a compressible, resilient composition, such as a polymer composition. Seal member 1124 includes a radial groove 1124A which is sized and shaped so as to sealingly engage with the wall of housing 10 which defines housing aperture 10B. The engagement between seal member 1124 and housing 10 is a sealed, airtight connection. Harness connector 1100 additionally includes pins 1119 having male ends for connection with leads of PCB 114. As shown in FIG. 10, pins 1119 are inserted in through-holes of PCB 114 and make electrical connections within PCB 114. Both pins 1119 are compliant pins which form press-fit connections with PCB 114 following insertion in through-holes of the PCB. Each pin 1119 has a girth which resiliently decreases during insertion in the PCB through-hole and increases following insertion to engage with the PCB surfaces which defines the PCB through-holes. Pins 1119 are mechanically and electrically connected to wires 1110, thereby resulting in electrical connectivity between wires 1110 and PCB 114.

With continued reference to FIG. 10, harness connector 1100 includes a casing 1125 surrounding wires 1110. Casing 1125 is constructed from a flexible material. Posts 1126 which extend from back member 1103 and are dimensioned and spaced from each other so that casing 1125 and wires 1110 wrap around posts 1126. In this way, wires 1110 are less capable of being pulled and disconnected from pins 1119.

Figure 11:
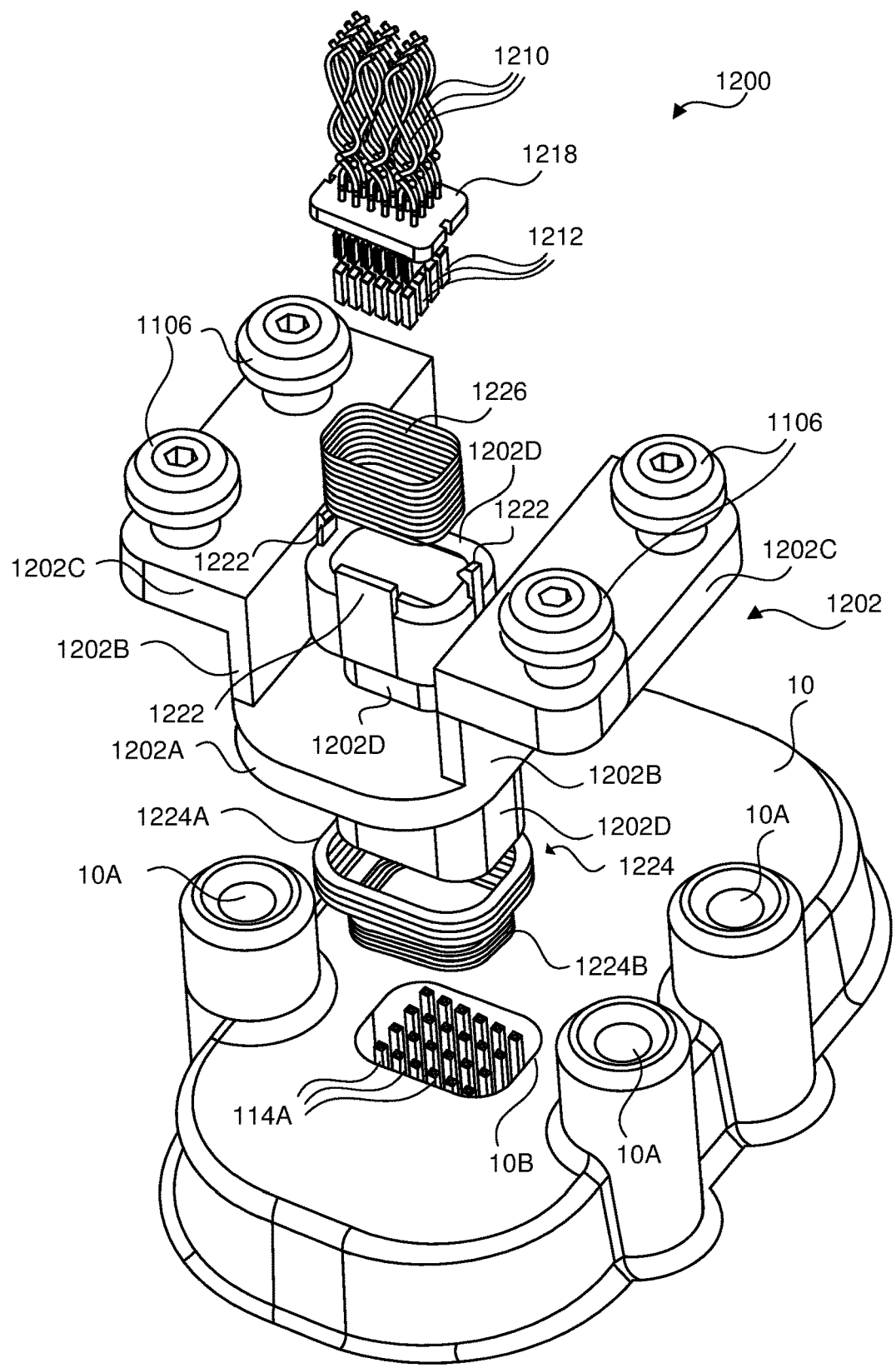
FIG. 11 is an exploded perspective view of a harness connector and electronics device according to another example embodiment.

In the example embodiments discussed above, the harness connectors are 2-wire connectors for electrically connecting two wires to PCB 114. It is understood that the harness connector may provide for electrical connections to PCB 114 with more than two wires. FIG. 11 illustrates a harness connector 1200 for providing electrical connectivity to PCB 114. Harness connector 1200 has a similar structure to harness connector 100, with like reference numbers corresponding to like harness connector components. A base member 1202 is formed from first segment 1202A; second segments 1202B, each of which extends from an end of first segment 1202A; third segments 1202C, each of which extends from a distal end of a second segment 1202B; and fourth segments 1202D which extend in opposite directions from first segment 1202A. Fourth segments 1202D and first segment 1202A define an inner space in which a plurality of electrical contacts 1212 are disposed. Each electrical contact 1212 includes a first portion which is sized and shaped for mechanically coupling to a pin 114A that is connected to PCB 114 and exposed by aperture 10B of electronics device housing 10, and a second portion which is mechanically connected to a wire 1210. As can be seen in FIG. 11, harness connector 1200 includes more than two wires 1210 and electrical contacts 1212 for providing electrical connections to more than two signal lines in PCB 114.

As further shown in FIG. 11, and due to the fact that harness connector 1200 is larger than harness connectors 100 and 700 for providing electrical connections to more than two wires 1210, each third segment 1202C of base member 1202 includes a plurality of apertures defined therethrough. This allows for harness connector 1200 to include more than two fasteners 1206, in this case four fasteners, for securely affixing harness connector 1200 directly to electronics device housing 10 via apertures 10A thereof.

Further, harness connector 1200 includes a plate member 1218 with apertures through which wires 1210 and/or electrical contacts 1212 extend. Plate member 1218 latches into position against a top surface of the upper fourth segment 1202D via deflectable protrusions 1222 which extend from the upper fourth segment 1202D and latch plate member 1218 in place following deflection of protrusions 1222 during insertion of plate 1218 against fourth segment 1202D. Harness connector 1200 additionally includes a first seal member 1224 for providing a water/air tight seal between base member 1202 and housing 10 of electronics device 120. Specifically, first seal member 1224 is constructed from a compressible, resilient material, such as a polymer composition, and is sized to fit around at least a portion of the lower fourth segment 1202D of base member 1202. Similar to first seal member 124, first seal member 1224 includes a first portion 1224A and a second portion 1224B which extends downwardly therefrom, as shown in FIG. 11. First portion 1224A and second portion 1224B of first seal member 1224 has the same inner diameter, with the outer diameter of first portion 1224A being greater than the outer diameter of second portion 1224B. Both first portion 1224A and second portion 1224B are sized and dimensioned to fit relatively tightly or otherwise snugly around lower fourth segment 1202D of base member 1202. Second portion 1224B is further sized to relatively tightly or otherwise snugly within the aperture 10B of housing 10. As shown in FIG. 11, the inner and outer surfaces of first portion 1224A and second portion 1224B include ribs. The ribs facilitate an airtight seal between harness connector 1200 and housing 10.

Harness connector 1200 further includes a second seal member 1226. Second seal member 1226, similar to second seal member 126 of harness connector 100, is constructed from a compressible, resilient material, such as a polymer. Second seal member 1226 is sized so that it is disposed within the upper fourth segment 1202D of base member 1202. Specifically, the upper fourth segment 1202D may include an inner space defined between plate member 1218 and a ledge defined within the upper fourth segment 1202D. Second seal member 1226 contacts the inner walls defining this inner space along the radial surface of second seal member 1226, contacts the ledge along the axial lower surface of second seal member 1226, and contacts plate member 1218 along the axial upper surface of second seal member 1226. In an example embodiment, second seal member 1226 includes a plurality of ribs dispose circumferentially around the outer surface and along the axial top and bottom surfaces of second seal member 1226. The ribs serve to provide an airtight seal between fourth segment 1202D and plate member 1218.

Similar to harness connector 100 and corresponding PCB 114 discussed above, electrical contacts 1212 of harness connector 1200 connect to pins 114A of a pin block 114B (not shown). Pins 114A of pin block 114B may provide through-hole or surface mount electrical connections to signal lines on or in PCB 114. In another embodiment, no pin block is used.

It is noted that harness connectors 100, 700, 1100 and 1200 advantageously result in wires 110, 710, 1110 and 1210, respectively, having a reduced length, compared with the length of wires associated with harness connector 30. This reduced wire length results in better signal quality.

The example embodiments have been described herein in an illustrative manner, and it is to be understood that the terminology which has been used is intended to be in the nature of words of description rather than of limitation. Obviously, many modifications and variations of the invention are possible in light of the above teachings. The description above is merely exemplary in nature and, thus, variations may be made thereto without departing from the spirit and scope of the invention as defined in the appended claims.

What is claimed is:

1. An electronics device, comprising:
   a printed circuit board having a plurality of electrical contacts;
   a housing in which the printed circuit board is disposed, the housing including an opening exposing the electrical contacts; and
   a harness connector directly attached to the housing and disposed over the opening, the harness connector comprising:
      a plurality electrical contacts electrically connected to the electrical contacts of the printed circuit board,
      a base member having a segment which is disposed at least partly within the opening of the housing, the plurality of electrical contacts disposed at least partly in the segment of the base member, and
      a seal member disposed between the segment and a portion of the housing defining the opening thereof, the seal member providing a sealed relationship between the base member and the portion of the housing defining the opening thereof.

2. The electronics device of claim 1, wherein the housing includes one or more apertures disposed along a surface of the housing relative to the opening, and the harness connector comprises a base member having one or apertures which align with the one or more apertures of the housing, and the harness connector further comprises one or more fasteners which extend through the one or more apertures of the base member and engage with the one or more apertures of the housing.

3. The electronics device of claim 1, wherein the seal member is constructed of a compressible, resilient material and includes ribs disposed along a first surface of the seal member for engaging with the portion of the housing defining the opening thereof, and ribs disposed along a second surface of the of the seal member for engaging with an outer surface of the segment of the base member.

4. The electronics device of claim 1, wherein the seal member includes a radial groove which engages with the portion of the housing defining the opening thereof.

5. The electronics device of claim 1, wherein the seal member includes a first portion disposed over an outer surface of the housing surrounding the opening thereof, and a second portion inserted in the opening of the housing.

6. The electronics device of claim 1, wherein the harness connector comprises a base member which is disposed over the opening of the housing, and a plate member which is disposed along a surface of the base member over or under the base member.

7. The electronics device of claim 6, wherein one of the base member and the plate member latches the other of the base member and the plate member in place relative to the one of the base member and the plate member.

8. The electronics device of claim 6, wherein the harness connector further comprises a plurality of wires which are mechanically and electrically connected to the electrical contacts of the harness connector, one of the wires and the electrical contacts extending through one or more apertures in the plate member.

9. An electronics device, comprising:
   a printed circuit board having a plurality of electrical contacts;
   a housing in which the printed circuit board is disposed, the housing including an opening exposing the electrical contacts; and
   a harness connector directly attached to the housing and disposed over the opening, the harness connector including a plurality electrical contacts electrically connected to the electrical contacts of the printed circuit board,
   wherein each of the electrical contacts of the printed circuit board comprises a through-hole, and each of the electrical contacts of the harness connector comprises a compliant, press-fit male contact member.

10. An electronics device, comprising:
    a printed circuit board having a plurality of electrical contacts;
    a housing in which the printed circuit board is disposed, the housing including an opening exposing the electrical contacts; and
    a harness connector directly attached to the housing and disposed over the opening, the harness connector including a plurality electrical contacts electrically connected to the electrical contacts of the printed circuit board,
    wherein the printed circuit board includes a pin block having pins extending therefrom, and the electrical contacts of the harness connector comprise female connector members which engage with the pins of the printed circuit board.

11. A harness connector for an electronics device having a housing and a printed circuit board disposed in the housing, and the housing including an opening exposing electrical contacts of the printed circuit board, the harness connector comprising:
    a base member with a plurality of apertures defined therein, the base member directly attached to the housing and disposed over the opening; and
    a plurality electrical contacts electrically connected to the electrical contacts of the printed circuit board,
    wherein the base member comprises a segment which extends at least partly into the opening of the housing, the segment defining an inner space, and the plurality of contacts are disposed at least partly in the inner space of the segment.

12. The harness connector of claim 11, further comprising a seal member disposed around at least a portion of the segment, the seal member constructed from a compressible, resilient composition so as to form a seal between the segment and a portion of the housing defining the opening thereof.

13. The harness connector of claim 12, further comprising a second seal member disposed within the inner space of the segment.

14. The harness connector of claim 11, wherein the base member comprises a seal member having a radial groove formed therein, the groove engaging with a portion of the housing which defines the opening.

15. The harness connector of claim 14, wherein the electrical contacts of the harness connector extend at least partly through the seal member.

16. The harness connector of claim 11, wherein each of the electrical contacts of the printed circuit board comprises a through-hole, and each of the electrical contacts of the harness connector comprises a compliant, press-fit male contact member, each press-fit male connector inserted in a corresponding through-hole of the printed circuit board.

17. The harness connector of claim 11, wherein the printed circuit board includes male connector members extending therefrom, and the electrical contacts of the harness connector comprise female connector members which engage with the pins of the printed circuit board.

\* \* \* \* \*